US012608317B2

(12) United States Patent
Segev et al.

(10) Patent No.: US 12,608,317 B2
(45) Date of Patent: Apr. 21, 2026

(54) CONTROLLER MEMORY BUFFER (CMB) AS CACHE

(71) Applicant: Sandisk Technologies, Inc., Milpitas, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/818,259

(22) Filed: Aug. 28, 2024

(65) Prior Publication Data

US 2026/0064596 A1 Mar. 5, 2026

(51) Int. Cl.
G06F 12/08 (2016.01)
G06F 12/0862 (2016.01)

(52) U.S. Cl.
CPC ................................ G06F 12/0862 (2013.01)

(58) Field of Classification Search
CPC ............. G06F 12/0862; G06F 12/0873; G06F 3/0656; G06F 3/0613; G06F 3/0653; G06F 3/0659; G06F 3/0679; G06F 2212/6028; G06F 2212/6022; G06F 2212/607; G06F 2212/7201
See application file for complete search history.

(56) References Cited

U.S. PATENT DOCUMENTS

| | | | |
|---|---|---|---|
| 10,503,635 B2 | 12/2019 | Kan et al. | |
| 10,564,872 B2 | 2/2020 | Benisty | |
| 10,860,492 B2 | 12/2020 | Du et al. | |
| 11,733,920 B2 | 8/2023 | Segev et al. | |
| 11,893,258 B2 | 2/2024 | Kabra et al. | |
| 2016/0011964 A1* | 1/2016 | Rostoker ............. | G06F 12/0246 |
| | | | 711/103 |
| 2018/0081569 A1* | 3/2018 | Kan .................... | G06F 12/0246 |
| 2019/0317901 A1* | 10/2019 | Kachare ................ | G06F 3/0679 |
| 2021/0141559 A1* | 5/2021 | Kim ...................... | G06F 3/0613 |
| 2022/0147440 A1* | 5/2022 | Benisty .............. | G06F 12/0868 |
| 2025/0069683 A1* | 2/2025 | Vu ...................... | G11C 29/4401 |

* cited by examiner

*Primary Examiner* — Tracy C Chan
(74) *Attorney, Agent, or Firm* — Patterson + Sheridan, LLP

(57) ABSTRACT

A controller memory buffer (CMB) is used by a host device for numerous purposes. One such purpose is to have data placed in CMB in response to a read command. The data is read from the memory device and placed in the CMB. However, for efficiency purposes, the data storage device may pre-fetch data. Pre-fetched data is stored in volatile memory that is distinct from CMB, but oftentimes in dynamic random access memory (DRAM), of which the CMB is a part. Rather than copying the data from DRAM and restoring the data in CMB, the data storage device can simply provide the DRAM address without moving the data to CMB, thus saving the step of copying data from DRAM to CMB.

20 Claims, 5 Drawing Sheets

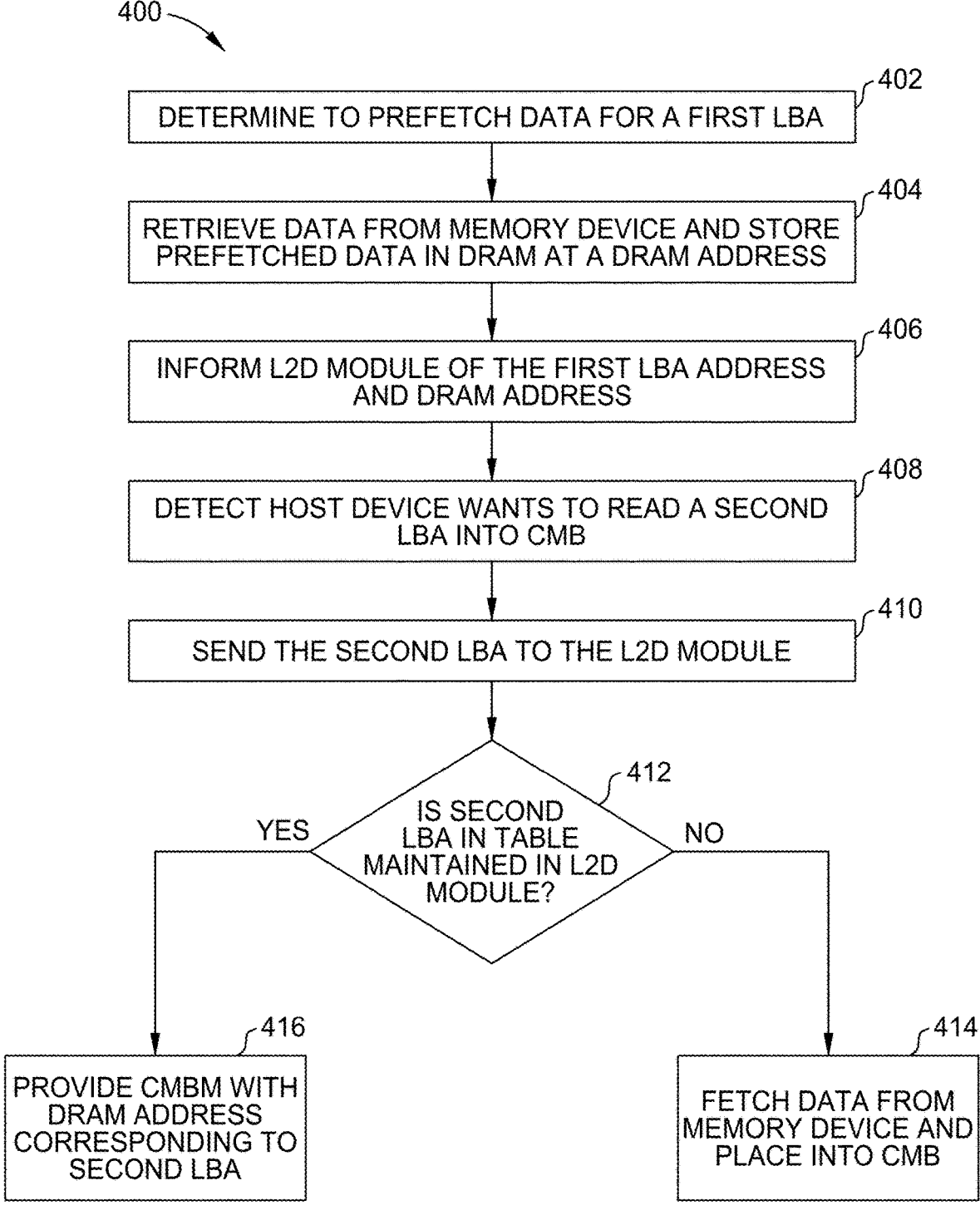

400

402
DETERMINE TO PREFETCH DATA FOR A FIRST LBA

404
RETRIEVE DATA FROM MEMORY DEVICE AND STORE PREFETCHED DATA IN DRAM AT A DRAM ADDRESS

406
INFORM L2D MODULE OF THE FIRST LBA ADDRESS AND DRAM ADDRESS

408
DETECT HOST DEVICE WANTS TO READ A SECOND LBA INTO CMB

410
SEND THE SECOND LBA TO THE L2D MODULE

412
IS SECOND LBA IN TABLE MAINTAINED IN L2D MODULE?

YES

NO

416
PROVIDE CMBM WITH DRAM ADDRESS CORRESPONDING TO SECOND LBA

414
FETCH DATA FROM MEMORY DEVICE AND PLACE INTO CMB

FIG. 4

CONTROLLER MEMORY BUFFER (CMB) AS CACHE

BACKGROUND OF THE DISCLOSURE

Field of the Disclosure

Embodiments of the present disclosure generally relate to efficient controller memory buffer (CMB) utilization.

Description of the Related Art

Some forms of non-volatile memory (NVM) express (NVMe) solid state drives (SSDs) hold a local dynamic random access memory (DRAM) where a portion of the DRAM is used as a controller memory buffer (CMB). CMB is a feature where the data storage device holds some local memory for host device usage. The CMB is managed by the host device. The CMB can be used for submission queues (SQs), completion queues (CQs), physical region page (PRP)/scatter gather list (SGL) (PRP/SGL) lists, and most commonly used user data.

When the host device issues an input/output (I/O) command, the host device can point to the CMB as the location of the data. For read commands, for example, once the controller sends a completion, the host device knows the data is in the CMB, and the host device can read the data using MemRd rather than an NVMe I/O command.

Some data storage devices perform a pre-fetch process whereby the data storage device attempts to predict what the host device will read next. In so doing, the controller will pre-fetch the data from the memory device before receiving a read command from the host device to read the data. The pre-fetched data is stored in volatile memory, such as DRAM, but not CMB because the data storage device is not allowed to store data in CMB without the host instructing the data storage device to do so. The more that the data storage device tries to optimize operations by pre-fetching, the more memory that is needed. Utilizing more memory can impact effective CMB utilization.

Therefore, there is a need in the art for improved CMB utilization.

SUMMARY OF THE DISCLOSURE

A controller memory buffer (CMB) is used by a host device for numerous purposes. One such purpose is to have data placed in CMB in response to a read command. The data is read from the memory device and placed in the CMB. However, for efficiency purposes, the data storage device may pre-fetch data. Pre-fetched data is stored in volatile memory that is distinct from CMB, but oftentimes in dynamic random access memory (DRAM), of which the CMB is a part. Rather than copying the data from DRAM and restoring the data in CMB, the data storage device can simply provide the DRAM address without moving the data to CMB, thus saving the step of copying data from DRAM to CMB.

In one embodiment, a data storage device comprises: a memory device; and a controller coupled to the memory device, wherein the controller is configured to: receive a read command from a host device, wherein the read command has a logical block address (LBA), wherein the read command is to read data for the LBA from the memory device to a location in a controller memory buffer (CMB); forward the LBA to a LBA to dynamic random access memory (DRAM) (L2D) module; scan a list in the L2D module; and determine whether the LBA matches an entry in the list.

In another embodiment, a data storage device comprises: a memory device; and a controller coupled to the memory device, wherein the controller is configured to: pre-fetch data from the memory device prior to receiving a read command to read the data from the memory device, wherein the pre-fetched data has a logical block address (LBA); store the pre-fetched data in dynamic random access memory (DRAM) at a DRAM address; inform a LBA to DRAM (L2D) module of the LBA for the pre-fetched data and the DRAM address; receive the read command, wherein the read command is to read the data from the memory device to a controller memory buffer (CMB); and access the data from the DRAM.

In another embodiment, a data storage device comprises: means to store data; and a controller coupled to the means to store data, wherein the controller is configured to: dynamically remap a range from a first portion of the means to store data to a second portion of the means to store data, wherein the second portion of the means to store data is a controller memory buffer (CMB); and maintain a module to hold lists of logical block address (LBA) to physical region page (PRP) relationships and LBA to the first portion relationships of data that has been pre-fetched.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 is flowchart illustrating pre-fetch operations according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

A controller memory buffer (CMB) is used by a host device for numerous purposes. One such purpose is to have data placed in CMB in response to a read command. The data is read from the memory device and placed in the CMB. However, for efficiency purposes, the data storage device may pre-fetch data. Pre-fetched data is stored in volatile memory that is distinct from CMB, but oftentimes in dynamic random access memory (DRAM), of which the CMB is a part. Rather than copying the data from DRAM and restoring the data in CMB, the data storage device can simply provide the DRAM address without moving the data to CMB, thus saving the step of copying data from DRAM to CMB.

Figure 1:
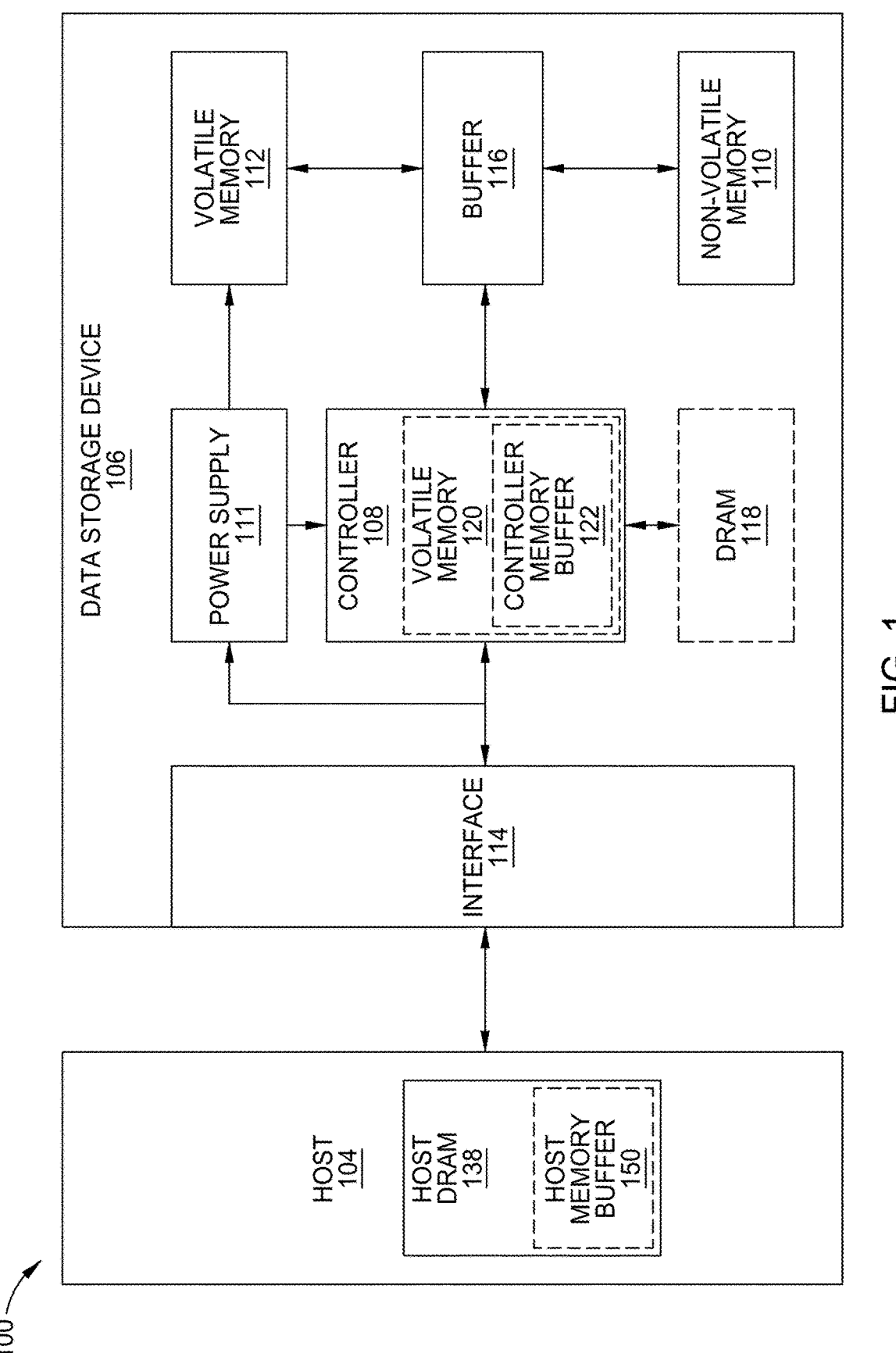
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
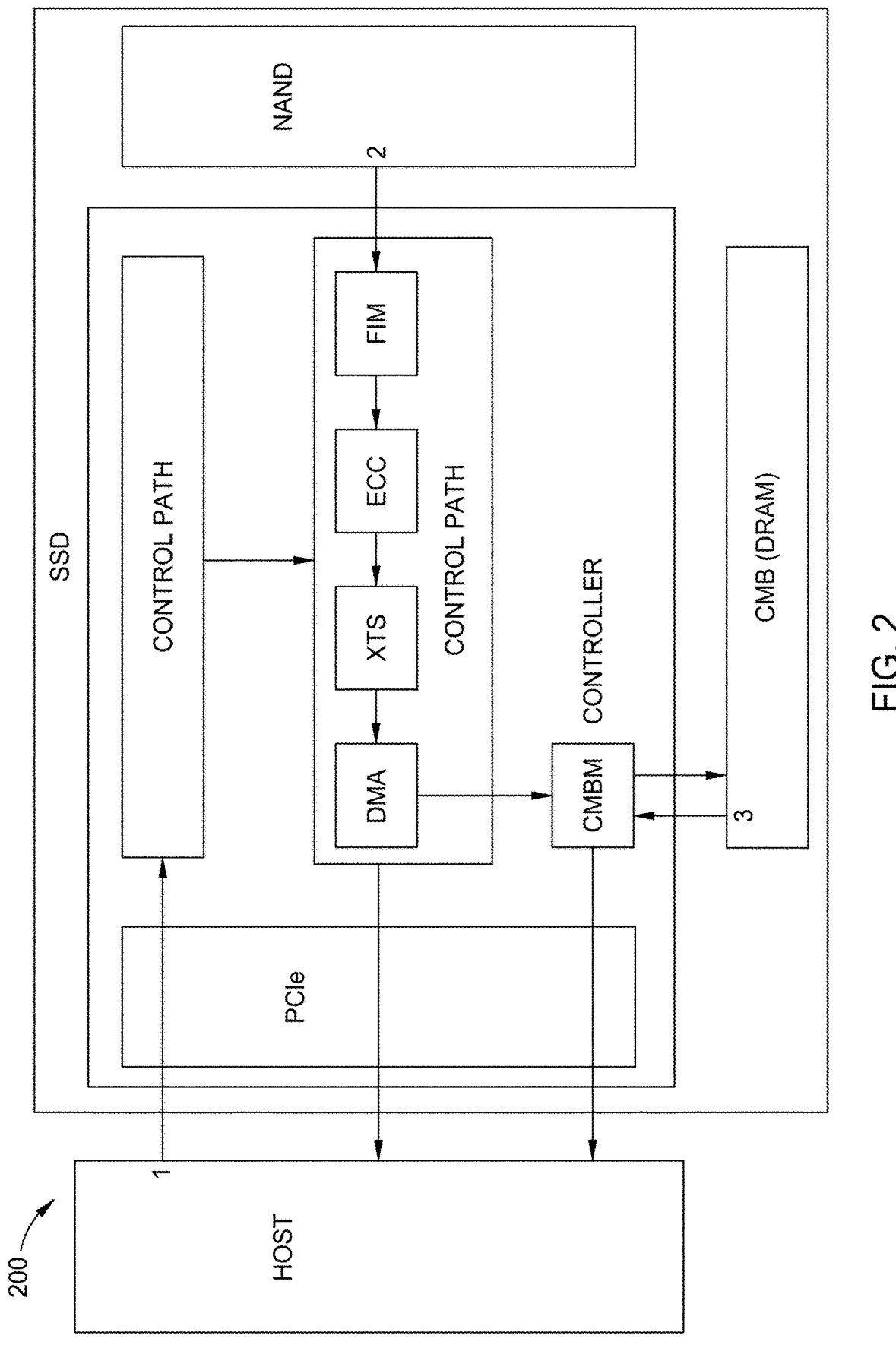
FIG. 2 is a schematic illustration of a data storage device command flow according to one embodiment.

FIG. 2 is a schematic illustration 200 of a data storage device command flow according to one embodiment. The illustration 200 shows a read flow, but an identical write flow is contemplated. The illustration 200 includes a host device coupled to a SSD. The SSD includes a controller, a CMB (in volatile memory, e.g., DRAM), and NVM (e.g., NAND). The controller includes a PCIe interface, a control path, a data path, and a CMB manager (CMBM). The data path includes a flash interface module (FIM), an error correction module (ECC), a decryption engine module (XTS), and a direct memory access (DMA) module used to transfer data to a destination.

The DMA can transfer data either to the host device or to the CMB through the CMBM. The destination of the data depends on where the host device selects to write the data. The CMBM is required to support both burst-writes from the DMA, and random-reads from PCIe interface.

There are three "sub flows" shown in FIG. 2: command path; NAND to CMB; and CMB to host device. In sub-flow 1, the host device sends a command to the controller. Part of the information in the command is the location in which to put the data (e.g., CMB). Sub-flow 1 ends when the control-path of the controller triggers the operation of the data path engines. In sub-flow 2, the FIM reads the required data from the NAND. The data passes through the ECC, XTS, and finally the DMA that decides where to send the data. In this case, the DMA sends the data to the CMB through the CMBM. In sub-flow 3, the host device reads from the CMB, through the CMBM, to receive the data of the read command.

A portion of DRAM (e.g., DRAM range) is dedicated for host device usage. The DRAM range allocated for the host device (e.g., CMB) cannot be used by the controller for the controller's own needs. For example, the host device may use a buffer for a write command instead of a read command, or for SQ, etc., in which case the CMB may function as the buffer or cache.

Controllers are often optimized to detect some LBA as "special" ranges. This includes read look ahead (RLA) and frequently accessed LBAs (i.e., hot-LBAs). The RLA is LBA ranges which the data storage device predicts that the host device is intending to read. As such, the data storage device will fetch the LBAs from the memory device (e.g., NAND) and the data from the LBAs in on-chip SRAM or DRAM until the data is required by the host device. Hot LBAs are LBAs that the data storage device detects as being read, and re-read repeatedly. In this case, the controller keeps this information in local SRAM or DRAM for fast access.

The Table below illustrates various data paths that occur during typical operation of the data storage device. On the left hand side is the origination point for the data. The host column is for entries where the command destination is the host device. The CMB column is for entries where command destination is the CMB.

TABLE

|  | Host | CMB |
|---|---|---|
| NAND | (1) NAND → SRAM → Host | (2) NAND → SRAM → DRAM(CMB) |
| SRAM | (3) SRAM → Host | (4) SRAM → DRAM(CMB) |
| DRAM | (5) DRAM(local) → SRAM → Host | (6) DRAM(local) → SRAM → DRAM(CMB) |

Entry (1) shows the case where the command destination is the host, and the LBA was not pre-fetched. In this case, the data is fetched from the NAND and goes through SRAM inside the data storage device, and from there to the host device.

Entry (2) shows the case where the command destination is the CMB, and the LBA was not pre-fetched. In this case, the data is fetched from the NAND and goes through SRAM inside the data storage device, and from there to the CMB, which is in the DRAM.

Entry (3) shows the case where the command destination is the host device, and the LBA was pre-fetched into SRAM inside the controller. In this case the data goes directly from the SRAM to the host device.

Entry (4) shows the case where the command destination is the CMB, and the LBA was pre-fetched into SRAM inside the controller. In this case the data goes directly from the SRAM to the CMB.

Entry (5) shows the case where the command destination is the host device, and the LBA was pre-fetched into the DRAM. In this case the data goes from the local DRAM range to the SRAM, and from there to the host device.

Entry (6) shows the case where the command destination is the CMB, and the LBA was pre-fetched into the DRAM. In this case the data is copied from DRAM (local, non-CMB range) to DRAM (CMB range) through an SRAM in the controller.

Hot-LBA, RLA, or in other cases where data might be pre-fetched, requires memory. The more the controller tries to optimize, the more memory the controller uses to store the data. As such, the use of DRAM is preferred over the use of SRAM as DRAM is generally more affordable then SRAM. However, when the data storage device supports CMB, this results in the situation where the data, in Entry (6) in particular, needs to be copied from the "local DRAM" range to the "CMB" range. Stated another way, in Entry (6), data within the DRAM is moved to a different location within the same DRAM, but to perform the move, the data goes through SRAM. Thus, the data goes from a first location within the DRAM, to SRAM, and then back to the same DRAM, but in a location different from the first location.

As will be discussed herein, the disclosure focuses on a way to share CMB and local DRAM ranges so that no copy from DRAM to DRAM occurs. More particularly, the disclosure focuses on the idea of using non-static memory allocation for CMB so that when the host device decides to read from CMB, the controller will direct the host device to the correct location in DRAM and not CMB. The fact that the correct location is DRAM and not CMB will be invisible to the host device.

Figure 3:
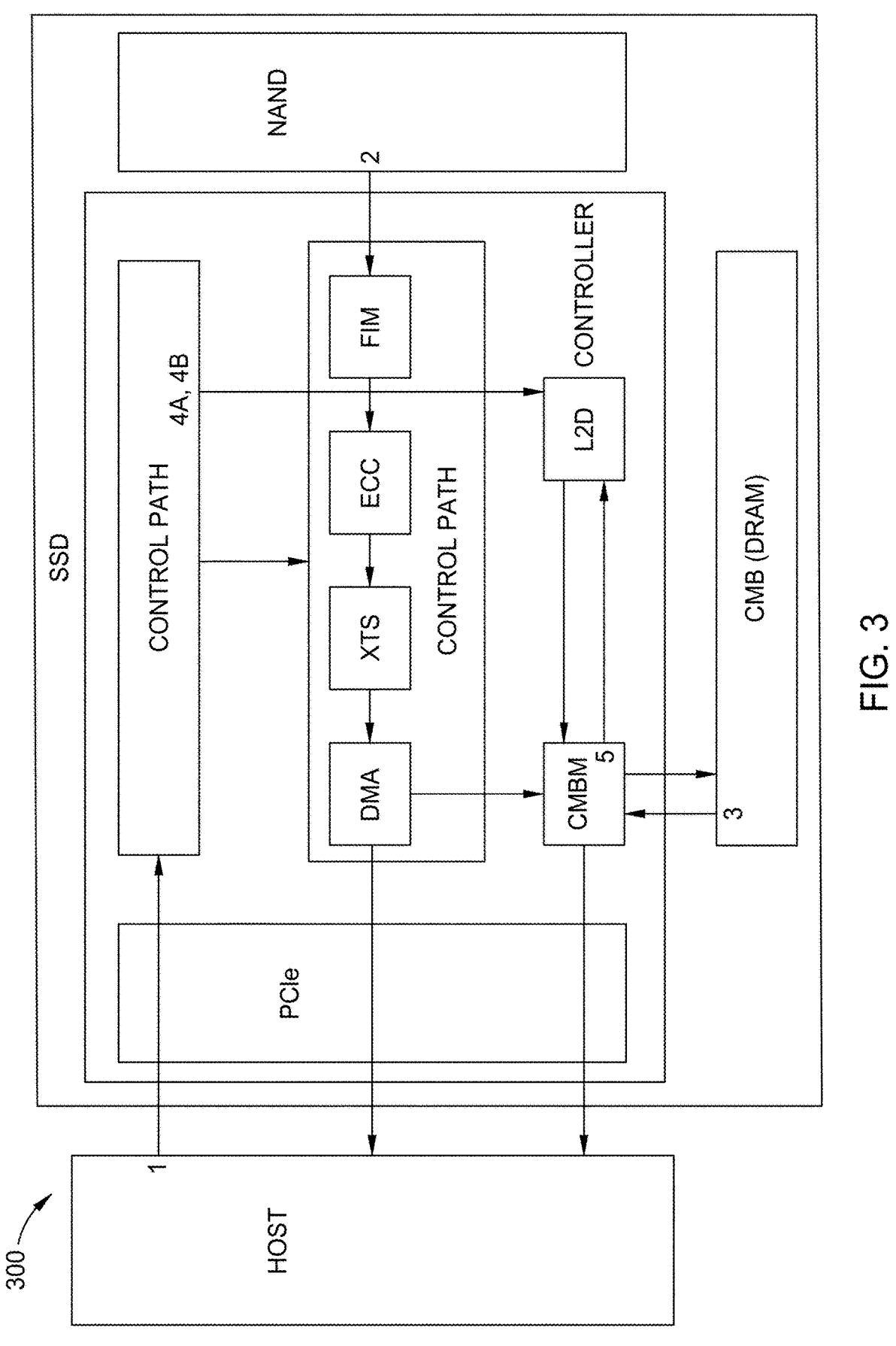
FIG. 3 is schematic illustration of a data storage device command flow according to another embodiment.

FIG. 3 is schematic illustration 300 of a data storage device command flow according to another embodiment. Illustration 300 contains the same components as FIG. 2, but additionally includes a LBA to DRAM (L2D) module that is in the controller and coupled to the CMBM and control path. Sub-flows 1-3 shown in FIG. 3 and are identical to sub-flows 1-3 discussed above with regards to FIG. 2. There are additional sub-flows shown in FIG. 3, sub-flows 4a, 4b, and 5.

In sub-flow 4a, when the control-path decides to pre-fetch an LBA into DRAM, the control-path informs the L2D module as to the LBA address and the matching local-DRAM address where the pre-fetched data is stored. Later, in sub-flow 4b, when the controller detects that the host device is trying to read an LBA into CMB, and that the LBA was already pre-fetched into local-DRAM, the control-path takes the command's PRP, and sends the PRP to the L2D module. The L2D module now holds "LBA to PRP" relations, and "LBA to DRAM-address" relations.

Generally speaking, there is a virtualization or mapping between the location where the data is (i.e., local-DRAM) and where the host device believes the data to be (i.e., CMB). When the host device tells the data storage device to copy data into the CMB, the host device provides the PRP for the data. The host device also provides the CMB location as the destination for the data. The PRP is for a specific LBA that will reside in the CMB. The mapping provides the information where the data really is located (i.e., local-DRAM). The data storage device changes the PRP to point to a different location (i.e., the local DRAM) that the host device believes is the CMB. The local-DRAM is the location where the data is placed in advance. The L2D module will hold a table that tracks everything. When a read command arrives, the table is checked to see if the data is pre-fetched and where the data is. If pre-fetched, the address provided to the L2D by the CMBM is updated to the local-DRAM location rather than the CMB and the host device is none the wiser. The table is updated each time data is pre-fetched and stored in DRAM and each time data is deleted from DRAM.

The host device reads from the PRP provided. Instead of going directly to DRAM, the CMBM checks the L2D module first. If there is a match, then the CMBM reads from the address provided by the L2D module instead of reading from the address that was provided in the read command. Basically, instead of copying data from DRAM to SRAM and back to CMB (in the same DRAM), a table in the L2D module is simply updated and consulted.

FIG. 4 is flowchart 400 illustrating pre-fetch operations according to one embodiment. Initially, a determination is made at block 402 to pre-fetch data for a first LBA. The data is then retrieved from the memory device and placed in a DRAM at a DRAM address at block 404. The L2D module is then informed of the first LBA address and DRAM address for the pre-fetched data at block 406.

At a later point in time, the host device may decide to read a second LBA into CMB at block 408. The data storage device knows to read the second LBA into CMB based upon the physical region page (PRP) address provided with the second LBA. The second LBA is sent to the L2D module 410 to see if the second LBA is listed in the table maintained by the L2D module. The determination of whether a match exists is made at block 412. If the second LBA matches an entry in the table, such as the second LBA matching the first LBA, then the L2D module provides the CMBM with the DRAM address corresponding to the second LBA at block 416. If there is no match at block 412, then the data is fetched from the memory device and placed in CMB as instructed by the host device at block 414.

Figure 5:
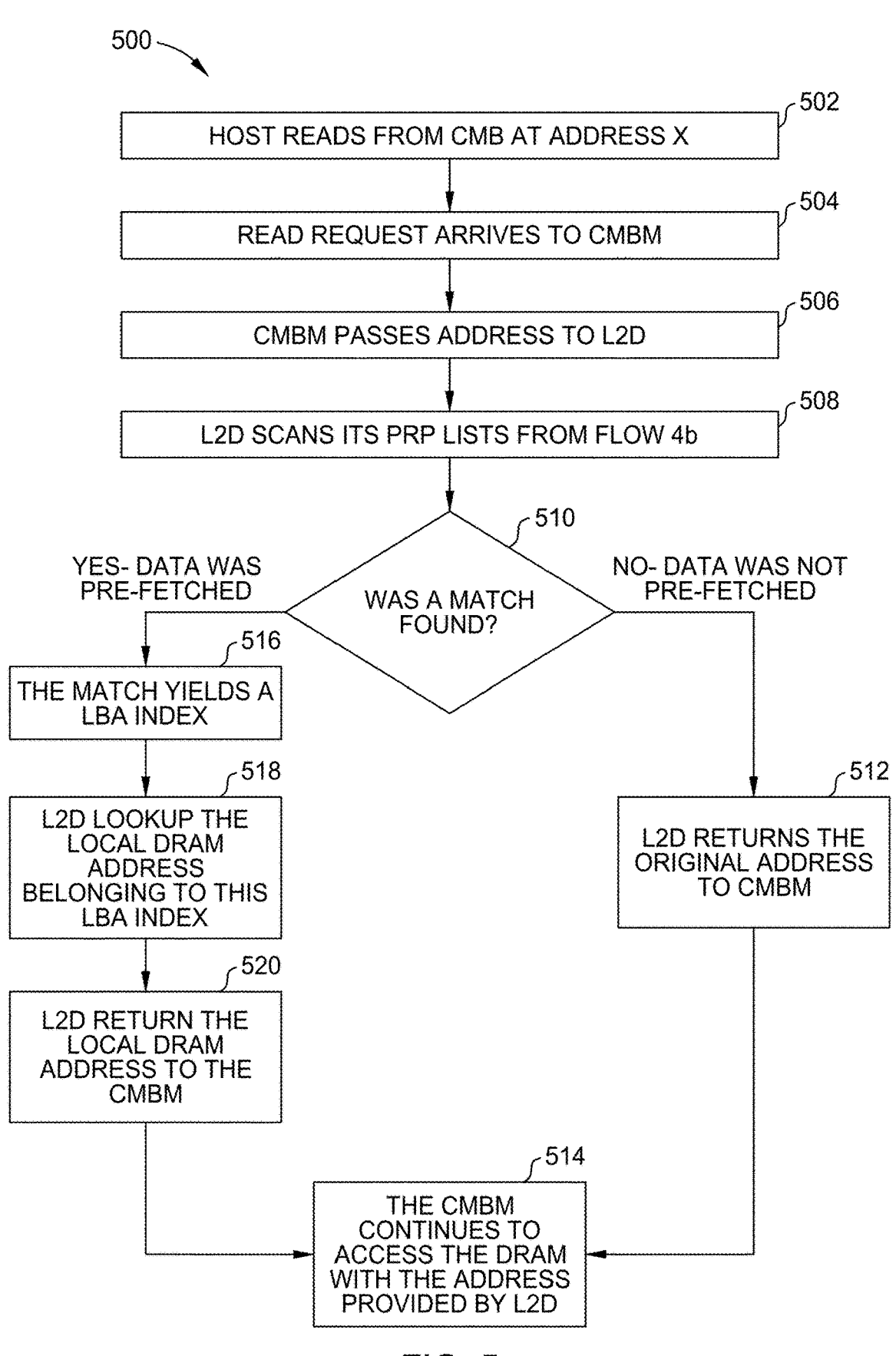
FIG. 5 is flowchart illustrating read command processing according to one embodiment.

FIG. 5 is flowchart 500 illustrating read command processing according to one embodiment. The flowchart 500 is an embodiment of sub-flow 5. Sub-flow 5 is a part of sub-flow 3 and starts when the host device tries to read from the CMB. The CMBM passes the CMB address in the L2D module to get a new address local-DRAM range where the data for the PRP for the read command exists. Then, the CMBM continues to fetch the data from the DRAM and passes the data to the host device.

More particularly with regards to sub-flow 5, the sub-flow starts when an address translate request arrives from the CMBM. Then the L2D module scans the PRP lists generated during sub-flow 4b. If there is no match, the flow ends and the original address is returned to the CMBM. However, if there is a match, the LBA from that match is used to find the location in the local-DRAM range where the relevant data has been pre-fetched to. The matched location in local-DRAM is the new address for the relevant data. The L2D module will provide the new address to the CMBM, which can than continue as normal.

More particularly with regards to FIG. 5, the host device initially reads from CMB at address X in block 502. Address X belongs to some previous PRP. Then, the read request arrives at the CMBM in block 504. Both blocks 502 and 504 are from sub-flow 3. Sub-flow 5 then begins.

At block 506, the CMBM passes the address to the L2D module which then scans the PRP list from sub-flow 4b at block 508. A determination is made at block 510 regarding whether there is a match between entries in the list and the address.

If there is no match at block 510, then the L2D module returns the original address (i.e., the address provided from the host device) to the CMBM at block 512, and the CMBM continues to access the DRAM with the address provided by the L2D module at block 514, which in the no match scenario is the same address that was provided by the host device. If there is no match at block 510, then the data was not pre-fetched.

If there is a match at block 510, then the data was pre-fetched. The match yields a LBA index at block 516 and the L2D module looks up the local DRAM address belonging to the LBA index at block 518 which was filled in sub-flow 4a. The L2D module then returns the local DRAM address to the CMBM at block 520 and the CMBM continues to access the DRAM with the address provided by the L2D module at block 514. Blocks 502, 504, and 520 are from sub-flow 3 while blocks 506, 508, 510, 512, 516, 518, and 520 are from sub-flow 5.

In one embodiment, a content-addressable memory (CAM) is used for the functionality of the L2D module. It is contemplated that other implementations besides CAM may be used for the L2D module. A CAM can provide the PRP address to LBA to DRAM address translation without the need for iterative scanning of the table which may impact performance.

By dynamically re-mapping local-DRAM areas into the CMB area, a copy of data from DRAM(local) to DRAM (CMB) might be skipped. Thus, latency is improved for read-predicted LBAs and workload on the DRAM is reduced.

In one embodiment, a data storage device comprises: a memory device; and a controller coupled to the memory device, wherein the controller is configured to: receive a read command from a host device, wherein the read command has a logical block address (LBA), wherein the read command is to read data for the LBA from the memory device to a location in a controller memory buffer (CMB); forward the LBA to a LBA to dynamic random access memory (DRAM) (L2D) module; scan a list in the L2D module; and determine whether the LBA matches an entry in the list. The controller is configured to return the LBA to a CMB manager upon determining that the LBA does not match an entry in the list and read the data from the memory device. The controller is configured to determine that the LBA matches an entry on the list, and wherein the L2D module is configured to return a new address to a CMB manager. The new address corresponds to a location in DRAM. The CMB is disposed in the DRAM, and wherein the new address is not in the CMB. The list contains addresses pre-fetched by the controller from the memory device. The controller is configured to pre-fetch data for at least one LBA from the memory device and store the pre-fetched data in DRAM at a DRAM address. The controller is configured to inform the L2D module of the LBA and the DRAM address. The controller is configured to receive a physical region page (PRP) with the read command and send the PRP to the L2D module. The L2D contains LBA to PRP information and LBA to DRAM address information.

In another embodiment, a data storage device comprises: a memory device; and a controller coupled to the memory device, wherein the controller is configured to: pre-fetch data from the memory device prior to receiving a read command to read the data from the memory device, wherein the pre-fetched data has a logical block address (LBA); store the pre-fetched data in dynamic random access memory (DRAM) at a DRAM address; inform a LBA to DRAM (L2D) module of the LBA for the pre-fetched data and the DRAM address; receive the read command, wherein the read command is to read the data from the memory device to a controller memory buffer (CMB); and access the data from the DRAM. The controller is configured to search a table in the L2D module for a match for the LBA. The controller is configured to receive a physical region page (PRP) for the read command. The controller is configured to send the PRP to the L2D module. The controller is configured to dynamically remap PRP to the DRAM address. The controller is configured to not copy the data from the DRAM to the CMB upon receipt of the read command. The L2D module is configured to maintain a list of LBA to physical region page (PRP) relationships and LBA to DRAM addresses.

In another embodiment, a data storage device comprises: means to store data; and a controller coupled to the means to store data, wherein the controller is configured to: dynamically remap a range from a first portion of the means to store data to a second portion of the means to store data, wherein the second portion of the means to store data is a controller memory buffer (CMB); and maintain a module to hold lists of logical block address (LBA) to physical region page (PRP) relationships and LBA to the first portion relationships of data that has been pre-fetched. Functionality of the module is by use of a content addressable memory (CAM) that is distinct from the means to store data. The module is coupled to a CMB management module.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
  receive a read command from a host device, wherein the read command has a logical block address (LBA), and wherein the read command is to read data for the LBA from the memory device to a location in a controller memory buffer (CMB);
  forward the LBA to a LBA to dynamic random access memory (DRAM) (L2D) module;
  scan a list in the L2D module;
  determine whether the LBA matches an entry in the list;
  pre-fetch data for at least one LBA from the memory device and store the pre-fetched data in DRAM at a DRAM address;
  inform the L2D module of the LBA and the DRAM address; and
  receive a Physical region page (PRP) with the read command and send the PRP to the L2D module.

2. The data storage device of claim 1, wherein the controller is configured to:
  return the LBA to a CMB manager upon determining that the LBA does not match an entry in the list; and
  read the data from the memory device.

3. The data storage device of claim 1, wherein the controller is configured to determine that the LBA matches an entry on the list, and wherein the L2D module is configured to return a new address to a CMB manager.

4. The data storage device of claim 3, wherein the new address corresponds to a location in DRAM.

5. The data storage device of claim 4, wherein the CMB is disposed in the DRAM, and wherein the new address is not in the CMB.

6. The data storage device of claim 1, wherein the list contains addresses pre-fetched by the controller from the memory device.

7. The data storage device of claim 1, wherein the L2D contains LBA to PRP information and LBA to DRAM address information.

8. The data storage device of claim 1, wherein the controller is configured to dynamically remap the PRP to the DRAM address.

9. The data storage device of claim 1, wherein the L2D module is configured to maintain a list of LBA to physical region page (PRP) relationships and LBA to DRAM addresses.

10. A data storage device, comprising:
a memory device; and
a controller coupled to the memory device, wherein the controller is configured to:
  pre-fetch data from the memory device prior to receiving a read command to read the data from the memory device, wherein the pre-fetched data has a logical block address (LBA);
  store the pre-fetched data in dynamic random access memory (DRAM) at a DRAM address;
  inform a LBA to DRAM (L2D) module of the LBA for the pre-fetched data and the DRAM address;
  receive the read command, wherein the read command is to read the data from the memory device to a controller memory buffer (CMB);
  access the data from the DRAM:
  receive a physical region page (PRP) for the read command; and
  send the PRP to the L2D module.

11. The data storage device of claim 10, wherein the controller is configured to search a table in the L2D module for a match for the LBA.

12. The data storage device of claim 10, wherein the controller is configured to dynamically remap the PRP to the DRAM address.

13. The data storage device of claim 10, wherein the controller is configured to not copy the data from the DRAM to the CMB upon receipt of the read command.

14. The data storage device of claim 10, wherein the L2D module is configured to maintain a list of LBA to physical region page (PRP) relationships and LBA to DRAM addresses.

15. The data storage device of claim 10, wherein the CMB is disposed in the DRAM.

16. The data storage device of claim 10, wherein the L2D contains LBA to PRP information and LBA to DRAM address information.

17. A data storage device, comprising:
means to store data; and
a controller coupled to the means to store data, wherein the controller is configured to:
  dynamically remap a range from a first portion of the means to store data to a second portion of the means to store data, wherein the second portion of the means to store data is a controller memory buffer (CMB);
  maintain a module to hold lists of logical block address (LBA) to physical region page (PRP) relationships and LBA to the first portion relationships of data that has been pre-fetched;
  receive a read command from a host device, wherein the read command has a logical block address (LBA);
  forward the LBA to a LBA to dynamic random access memory (DRAM) (L2D) module; and
  receive a physical region page (PRP) with the read command and send the PRP to the L2D module.

18. The data storage device of claim 17, wherein functionality of the module is by use of a content addressable memory (CAM) that is distinct from the means to store data.

19. The data storage device of claim 17, wherein the module is coupled to a CMB management module.

20. The data storage device of claim 17, wherein the L2D contains LBA to PRP information and LBA to DRAM address information.

* * * * *